(12) United States Patent
Lee et al.

(10) Patent No.: US 7,675,572 B2
(45) Date of Patent: Mar. 9, 2010

(54) IMAGE PROCESSING DEVICE CAPABLE OF SELECTING FIELD AND METHOD THEREOF

(75) Inventors: Young-ho Lee, Yongin-si (KR); Seung-joon Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1196 days.

(21) Appl. No.: 11/237,959

(22) Filed: Sep. 29, 2005

(65) Prior Publication Data

US 2006/0072035 A1   Apr. 6, 2006

(30) Foreign Application Priority Data

Oct. 6, 2004   (KR) .................. 10-2004-0079586

(51) Int. Cl.
*H04N 7/01* (2006.01)
(52) U.S. Cl. ...................... 348/441; 348/452
(58) Field of Classification Search .......... 348/441, 348/459, 458, 448, 446, 451, 452, 443; *H04N 7/01, H04N 11/20*
See application file for complete search history.

(56) References Cited

U.S. PATENT DOCUMENTS 7,057,665 B2 *  6/2006  Jung et al. ................ 348/452

2005/0078215 A1 *  4/2005  Swartz ........................ 348/452

FOREIGN PATENT DOCUMENTS

| JP | 2001-169252 | 6/2001 |
|---|---|---|
| JP | 2002-57993 | 2/2002 |
| JP | 2002-247529 | 8/2002 |

(Continued)

OTHER PUBLICATIONS

Korean Office Action dated May 12, 2006 issued in KR 2004-79586.

(Continued)

*Primary Examiner*—Sherrie Hsia
(74) *Attorney, Agent, or Firm*—Stanzione & Kim LLP

(57) ABSTRACT

An image processing device and method to select a field to use in interpolation, if an input image is a film image. The image processing device includes a field selector to select a field to use to interpolate a current field based on difference values in field data among first, second, and third fields being consecutively input in an input image, the field to use to interpolate the current image being one of the first and the third fields and the current field being the second field, a film detector to generate a pattern based on the difference values in the field data between the first, second, and third fields and to determine whether the input image is a film image based on the generated pattern, and an interpolator to interpolate the second field using the one of the first and third field selected by the field selector if the film detector determines the input image to be a film image. Accordingly, when the input image is a film image without a bad-edit, the interpolation process is executed by selecting two temporarily consecutive fields of a field to be interpolated, and using the field with a smaller difference values in field data from the field to be interpolated and a problem of judder in images can be resolved.

33 Claims, 4 Drawing Sheets

FOREIGN PATENT DOCUMENTS

| | | |
|---|---|---|
| KR | 2002-44714 A | 6/2002 |
| KR | 2004-10862 | 2/2004 |
| KR | 2004-10862 A | 2/2004 |
| KR | 2004-50577 A | 6/2004 |
| WO | WO 03/084227 | 10/2003 |

OTHER PUBLICATIONS

Japanese Office Action dated Jul. 31, 2007 issued in JP 2005-294085.

* cited by examiner

IMAGE PROCESSING DEVICE CAPABLE OF SELECTING FIELD AND METHOD THEREOF

CROSS-REFERENCE TO RELATED APPLICATIONS

This application claims benefit under 35 U.S.C. § 119 from Korean Patent Application No. 2004-79586, filed on Oct. 6, 2004, the disclosure of which is incorporated herein in its entirety by reference.

BACKGROUND OF THE INVENTION

1. Field of the Invention

The present general inventive concept relates in general to an image processing device capable of selecting a field and a method thereof. More specifically, the present general inventive concept relates to an image processing device which is capable of selecting a field to use in interpolation if an input image is a film image, and a method thereof.

2. Description of the Related Art

Cinema films are typically recorded at 24 frames per second. Each frame is instantly stored on film and shot on a screen at one time, producing a progressive image together. On the other hand, TVs have different image processing speeds (or frame rates) that depend on TV transmission systems. For example, NTSC (National Television System Committee) runs at 30 frames per second, whereas PAL (Phase Alternation Line) and SECAM (Sequential Couleur Memoire) videos run at 25 frames per second. Since TV broadcasts transmit an image using radio waves, the number of scanning lines of each frame ranges several hundreds for photographing and transmission thereof, and the image is displayed on a cathode ray tube through scanning.

In order to show motion pictures more effectively with a limited number of scanning lines, TV usually adopts an interlacing method where a frame is divided into two fields, which are alternately scanned. Therefore, the NTSC system processes an image at 60 fields per second, whereas the PAL and the SECAM systems process an image at 50 fields per second.

On the other hand, when a cinema film is played back on a TV monitor at a TV frame rate, an image on an NTSC television system (which runs at 30 frames per second) will look faster because the number of frames per second differs in a movie screen and the TV monitor. Therefore, in a case in which a cinema film is transmitted to the NTSC television system, 60 fields must be obtained from 24 frames per second, namely, 5 fields from 2 frames, to synchronize the cinema film with the NTSC television system. In general, a 3:2 pull-down technique is most commonly used for converting 24 frame per second motion picture material to 60 field per second video and NTSC. In the 3:2 pull-down, one film frame is scanned into three fields and the next frame is scanned into two fields. That is, 2 frames are scanned into five fields. On the other hand, when a cinema film is played back on a PAL television system or a SECAM television system, 50 fields must be created from 25 frames per second, i.e., 2 fields from each frame. This method is called a 2:2 pull-down, where each film frame is scanned into two frames. Normally, one frame of a film is composed of a top field with odd lines and a bottom field with even lines. Thus, in order to create 3 fields for film to video conversion in the 3:2 pulldown, one of the top and bottom fields is repeated.

FIG. 1 is a block diagram illustrating a conventional image processing device.

Referring to FIG. 1, the conventional image processing device includes a pattern generation unit 10, a film determination unit 20, and an interpolation unit 30. The pattern generation unit 10 calculates a difference in pixel values between fields for three temporarily consecutive fields of an input image, and generates a pattern with respect to a predetermined threshold. For example, the pattern generation unit 10 calculates a difference in pixel values between two temporarily consecutive fields, such as a first field and a second field. If the difference in the pixel values is greater than the predetermined threshold, the pattern generation unit 10 generates a "1", whereas if the difference in pixel values is less than the predetermined threshold the pattern generation unit 10 generates a "0", thereby generating the pattern.

The film determination unit 20 determines whether an input image is a film image, based on the pattern generated by the pattern detection unit 10. Since a film image usually has a certain pattern, it is possible to determine whether the input image is a film image or not by comparing the pattern generated by the pattern detection unit 10 with a pre-stored film image pattern.

The interpolation unit 30 interpolates the input image according to the determination made by the film determination unit 20. That is, if the film determination unit 20 determines that the input image is not a film image, the interpolation unit 30 executes spatial interpolation using data of an interpolation target field only. However, if the film determination unit 20 determines that the input image is a film image, the interpolation unit 30 interpolates the interpolation target field using information of fields that are temporarily consecutive to the interpolation target field.

Accordingly, if the input image is a film image, the interpolation unit 30 of the conventional image processing device interpolated a current field using a previous field or a next field of the current field that is selected on the basis of the pattern generated by the pattern detection unit 10. However, judder may occur in an image processed by the conventional image processing device because the generated pattern might have an error, or a field that is not originated from the same progressive frame, such as a bad-edit, is used for interpolation. A bad-edit is detected when the sequence of a 3:2 pull-down image steam or a 2:2 pull-down image stream is inverted during the edition, losing the regularity of the pull-down.

SUMMARY OF THE INVENTION

The present general inventive concept provides an image processing device and method, wherein if an input image is a film image, the image processing device is capable of selecting a field to use to interpolate a current field by selecting a field having small difference values of field data from the current field among temporarily consecutive fields to the current field.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing an image processing device capable of selecting a field, the device including a field selector to select a field to be used to interpolate a current field based on difference values in field data between first, second, and third consecutively input fields of the input image, wherein the field to be used to interpolate the current field is one of the first field and the third field, and the current field is the second field, a film detector to generate a pattern based on the difference values in field data between the fields, and to determine whether the input image is a film image based on the generated pattern, and an interpolator to interpolate the second field using the one of the first and third fields selected by the field selector if the film detector determines the input image to be the film image.

The difference values in the field data between the fields can include one of differences in pixel values between the fields, differences in an amount of judder between the fields, SAD (Sum of Absolute Difference) values between the fields, and differences in motion estimation between the fields.

The field selector can include a first field difference detecting part to detect first difference values in field data between the first field and the second field, a second field difference detecting part to detect second difference values in field data between the second field and the third field, a calculator to calculate a first value, a second value and a third value, the first value being a sum of the first difference values detected by the first field difference detecting part, the second value being a sum of the second difference values detected by the second field difference detecting part, and third value being an absolute value of a difference between the first value and the second value; and a comparer to compare a predetermined threshold with an absolute value of a difference between the third value and at least one of the first value, the second value, and 0 according to the third value, and to select one of the first field and the third field to be used to interpolate the second field based on the comparison result.

The comparer can compare the predetermined threshold with an absolute value of the third value if the third value is 0, a difference between the third value and the first value if the third value is equal to the first value, and a difference between the third value and the second value if the third value is equal to the second value.

The comparer can select one of the first field and the third field if the third value is 0 and less than the predetermined threshold, the third field if the third value is equal to the first value and the absolute value of the difference between the third value and the first value is less than the predetermined threshold, and the first field if the third value is equal to the second value and the absolute value of the difference between the third value and the second value is less than the predetermined threshold.

The comparer can select neither the first field nor the third field if the third value is not equal to the first value, the second value, and 0.

If the input image is not the film image, the interpolator can interpolate the second field based on an adjacent pixel value to a pixel to be interpolated within the second field.

The foregoing and/or other aspects of the present general inventive concept are also achieved by providing an image processing device, including a film detector to determine whether an input image is a film image, a selection unit to receive a current field of an input image to be interpolated and first and second neighboring fields of the current field and to determine which of the first and second neighboring fields originates from the same progressive frame of the input image as the current field, and an interpolation unit to temporally interpolate the current field using one of the first and second neighboring fields determined to originate from the same progressive frame as the current field when the film detector determines that the input image is the film image.

The foregoing and/or other aspects of the present general inventive concept are also achieved by providing an interpolator usable with an image processing device to interpolate a current field of an input film image, including a selection unit to select one of a previous field and a next field of the input film image as having small difference values with respect to the current field, and a temporal interpolation unit to temporally interpolate the current field using field data of the one of the previous field and the next field selected by the selection unit.

The foregoing and/or other aspects of the present general inventive concept are also achieved by providing an image processing method including selecting a field to be used to interpolate a current field based on difference values between first, second, and third consecutively input fields in an input image, wherein the field to be used to interpolate the current field is one of the first field and the third and the current field is the second field, generating a pattern based on the difference values in field data between the first, second, and third fields and determining whether the input image is a film image based on the generated pattern, and interpolating the second field using the one of the first and third fields selected by the field selector if the input image is the film image.

The difference values in field data between the fields can include one of differences in pixel values between the fields, differences in an amount of judder between the fields, SAD (Sum of Absolute Difference) values between the fields, and differences in motion estimation between the fields.

The selecting of the field to be used to interpolate the current field can include detecting first difference values in field data between the first field and the second field and second difference values in field data between the second field and the third field, calculating a first value, a second value and a third value, the first value being a sum of the first difference values, the second value being a sum of the second difference values, and third value being an absolute value of a difference between the first value and the second value, and comparing a predetermined threshold with an absolute value of a difference between the third value and at least one of the first value, the second value, and 0 according to the third value, and selecting one of the first field and the third field to be used to interpolate the second field based on the comparison result.

The comparing of the predetermined threshold with the absolute value of the difference between the third value and at least one of the first value, the second value, and 0 according to the third value can include comparing the predetermined threshold with the third value if the third value is 0, the difference between the third value and the first value if the third value is equal to the first value, and the difference between the third value and the second value if the third value is equal to the second value.

The selecting of one of the first field and the third field to be used to interpolate the second field based on the comparison result can include selecting one of the first field and the third field if the third value is 0 and less than the predetermined threshold, selecting the third field if the third value is equal to the first value and the difference between the third value and the first value is less than the predetermined threshold, and selecting the first field if the third value is equal to the second value and the difference between the third value and the second value is less than the predetermined threshold.

Neither the first field nor the third field can be selected if the third value is not equal to the first value, the second value, or 0.

The method can further include interpolating the second field based on an adjacent pixel value to a pixel to be interpolated within the second field if the input image is not determined to be the film image.

The foregoing and/or other aspects of the present general inventive concept are also achieved by providing a method of processing an input image, including determining whether the input image is a film image, determining which of first and second neighboring fields of an interpolation target field of the input image originate from the same progressive frame of the input image as the interpolation target field, and temporally interpolating the interpolation target field using one of the first and second neighboring fields determined to originate from the same progressive frame as the interpolation target field when the input image is determined to be the film image.

The foregoing and/or other aspects of the present general inventive concept are also achieved by providing a method of interpolating a current field of an input film image, including selecting one of a previous field and a next field of the input film image as having small difference values relative to the current field, and temporally interpolating the current field using field data of the selected one of the previous field and the next field.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
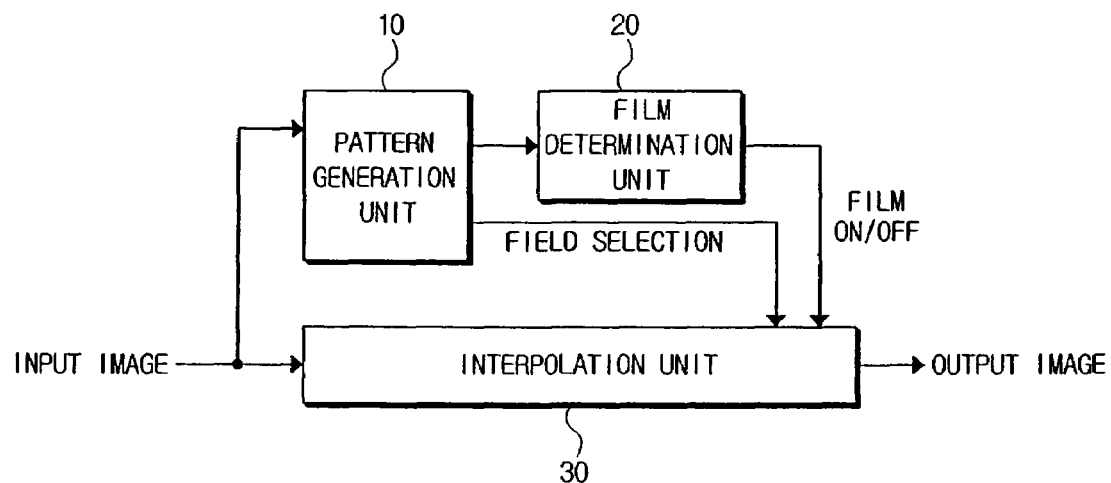
FIG. 1 is a block diagram illustrating a conventional image processing device.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
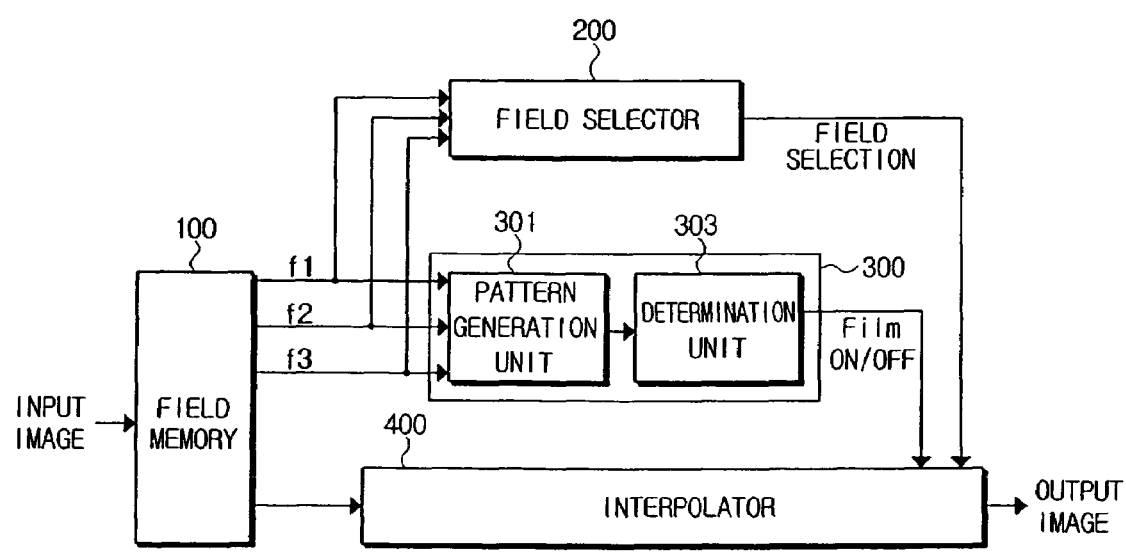
FIG. 2 is a block diagram illustrating an image processing device capable of selecting a field according to an embodiment of the present general inventive concept.

FIG. 2 is a block diagram illustrating an image processing device capable of selecting a field according to an embodiment of the present general inventive concept.

Referring to FIG. 2, the image processing device includes a field memory 100, a field selector 200, a film detector 300 and an interpolator 400. The film detector 300 may include a pattern generation unit 301 and a determination unit 303.

The field memory 100 stores input images by fields.

The field selector 200 selects a field for interpolation by using three temporarily consecutive fields among the fields stored in the field memory 100. For example, the three temporarily consecutive fields can include a first field, a second field, and a third field, and the second field is the one to be interpolated. In this case, the field selector 200 selects one of the first field and the third field to be used to interpolate the second field. The field selector 200 outputs information regarding the selected field to the interpolator 400.

The pattern generation unit 301 of the film detector 300 calculates differences in pixel values between the three temporarily consecutive fields of the input images, and compares the calculated differences with a predetermined threshold to generate a pattern. If the differences in the pixel values between the temporarily consecutive fields, such as the first field and the second field, are greater than the predetermined threshold, the pattern generation unit 301 generates a "1", otherwise the pattern generation unit 301 generates a "0", thereby generating the pattern. The pattern generation unit 301 also calculates the differences in the pixel values between the second field and the third field and compares the differences with the predetermined threshold to generate the pattern.

The determination unit 303 of the film detector 300 compares the pattern of an input image generated by the pattern generation unit 301 with a predetermined film image pattern to determine whether the input image is a film image. The determination unit 303 of the film detector 300 outputs the determination result to the interpolator 400, which executes the interpolation using the field selected by the field selector 200, depending on the determination result provided from the film detector 300.

The interpolator 400 interpolates the input image according to the results of the field selector 200 and the film detector 300. For example, if the film detector 300 determines that the input image is not a film image, the interpolator 400 executes a spatial interpolation process on the second field using data of the second field only. However, if the film detector 300 determines that the input image is a film image, the interpolator 400 executes the interpolation process on the second field using data of the field selected by the field selector 200. That is, if the input image is a film image, the interpolator 400 interpolates the second field using the selected one of the first field and the third field, which are temporarily consecutive with the second field.

Figure 3A:
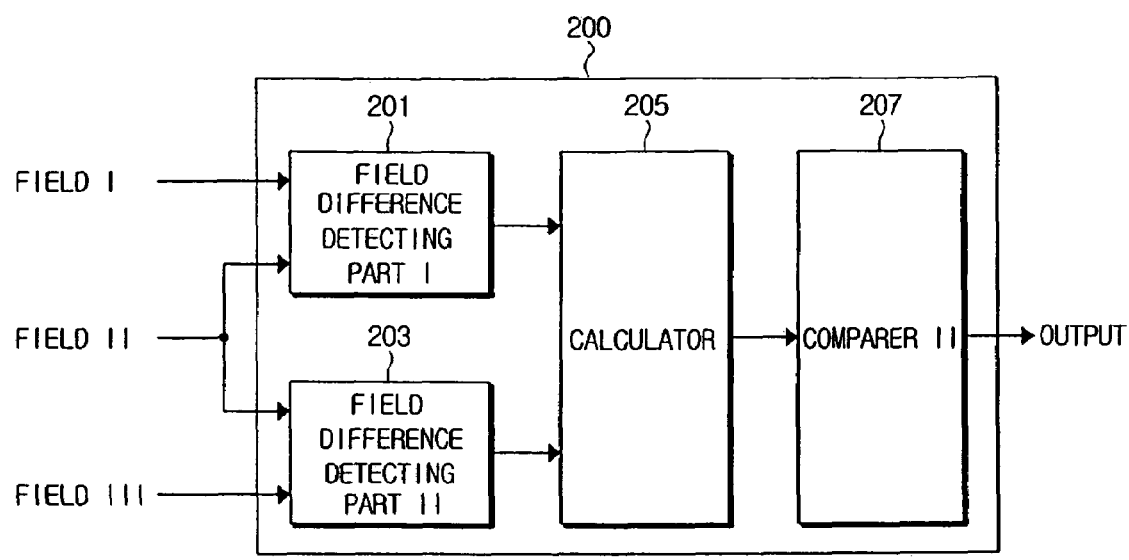
FIGS. 3A to 3C are block diagrams illustrating a field selector of the image processing device of FIG. 2 according to various embodiments of the present general inventive concept.
Figure 3B:
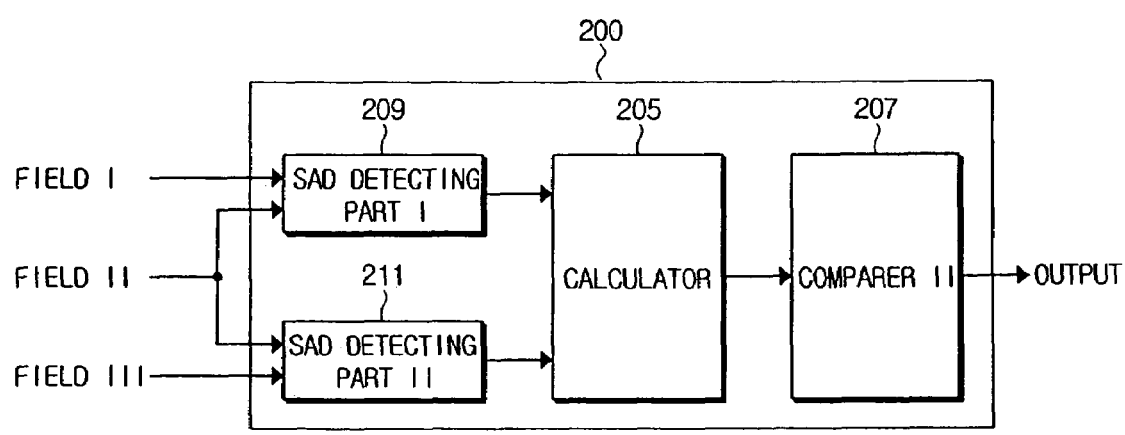
Figure 3C:
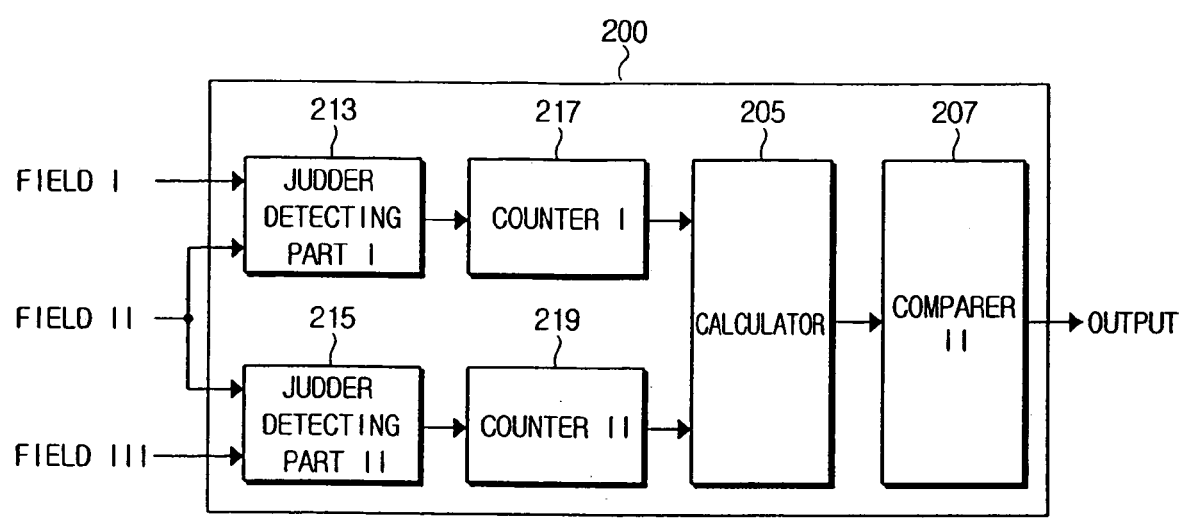

FIGS. 3A to 3C are block diagrams illustrating the field selector 200 of the image processing device of FIG. 2 according to various embodiments of the present general inventive concept. FIG. 3A illustrates the field selector 200 selecting the field to use in the interpolation by using difference values in field data between the consecutive fields. FIG. 3B illustrates the field selector 200 in a case in which the difference values in the field data are SAD (Sum of Absolute Difference) values. FIG. 3C illustrates the field selector 200 in a case in which the difference values in the field data are judder values.

Referring to FIG. 3A, the field selector 200 includes a first field difference detecting part 201, a second field difference detecting part 203, a calculator 205 and a comparer 207.

When the three temporarily consecutive input fields, i.e., the first field, the second field, and the third field, are input to the field selector 200, the first field difference detecting part 201 detects difference values in the field data between the first field and the second field. The second field difference detecting part 203 detects difference values in the field data between the second field and the third field. For example, the difference values in the field data can include differences in pixel values between the fields, differences in an amount of judder between the fields, SAD (Sum of Absolute Difference) values between the fields, differences in motion estimation between the fields, etc.

The calculator 205 calculates sums of difference values detected in the first and second field difference detecting part and a difference value of the calculated sums. That is, the calculator 205 calculates a first value that is a sum of difference values in field data between the first field and the second field, and a second value that is a sum of difference values between the second field and the third field. The calculator 205 then calculates a third value that is a difference value between the first value and the second value. If the input image is a film image without a bad-edit, a current field (i.e. the second field) has at least one consecutive field that originates from the same progressive frame. Accordingly, when two consecutive fields originate from the same progressive frame, the field data between the two consecutive fields is the same and the sum of difference values in the field data between the two consecutive fields is 0.

The calculator 205 calculates the sum of difference values in the field data between the consecutive fields as follows.

$$e_{npre} = \sum_{x,y} |f_{n-1}(x, y) - f_n(x, y)|$$
$$e_{nnext} = \sum_{x,y} |f_{n+1}(x, y) - f_n(x, y)|$$ [Equation 1]

wherein, $e_{nprev}$ is the first value, i.e., the sum of difference values in the field data between the first field and the second field, and $e_{nnext}$ is the second value, i.e., the sum of difference values between the second field and the third field. Also, $f_n$ is the current field, i.e., the second field, $f_{n-1}$ is a previous field to the current field, i.e., the first field, and $f_{n+1}$ is a next field to the current field, i.e., the third field.

The calculator 205 calculates the difference in the sums of the difference values in field data between the fields obtained by Equation 1. That is, the calculator 205 calculates the third value that is the difference between the first value and the second value as follows.

$$|e_{npre}-e_{nnext}|=0, f_{n-1}=f_n=f_{n+1}$$

$$|e_{npre}-e_{nnext}|=e_{nnext}, f_{n-1}==f_n$$

$$|e_{npre}-e_{nnext}|=e_{npre}, f_n=f_{n+1}$$

$$|e_{npre}-e_{nnext}|\neq 0, |e_{npre}-e_{nnext}|\neq e_{nnext}, |e_{npre}-e_{nnext}|\neq e_{npre}, f_{n-1}\neq f_n, f_n\neq f_{n+1}$$ [Equation 2]

wherein, $e_{nprev}$ is the first value, i.e., the sum of difference values in the field data between the first field and the second field, and $e_{nnext}$ is the second value, i.e., the sum of difference values in the field data between the second field and the third field. Also, $f_n$ is the current field, i.e., the second field, $f_{n-1}$ is the previous field to the current field, i.e., the first field, and $f_{n+1}$ is the next field to the current field, i.e., the third field.

As illustrated in Equation 2, if the third value, which is an absolute value of the difference between the first value and the second value is equal to 0, the first and second values are equal to each other. In this case, the first and second values can both be equal to 0 and the field data values of the first field, the second field and the third field are equal. If the third value equals to the second value, the first field and the second field have the same field data. If the third value is equal to the second value, the first value is equal to 0. Accordingly, the sum of difference values $e_{nprev}$ in the field data between the first and second fields is equal to 0. Therefore, the field data values of the first field and the second field are the same, and the first and second fields originate from the same progressive frame.

However, if the third value, which is the absolute value of the difference between the first value (the sum $e_{nprev}$ of difference values in the field data between the first field and the second field) and the second value is equal to the first value, the field data values of the second field and the third field are equal. If the third value is equal to the first value, the second value is equal to 0. Accordingly, the sum of difference values $e_{nnext}$ in the field data between the second and third fields is equal to 0. Therefore, the field data values of the second field and the third field are the same, and the second and third fields originate from the same progressive frame.

If the third value is not equal to 0, the first value, or the second value, there is no consecutive field having the same field data value as the current field (i.e., the second field). This corresponds to a case in which the input image is a film image with a bad-edit or the input image is not a film image.

Although the third value is described above as being an absolute value of the difference between the first value and the second value, the calculator 205 can alternatively calculate the third value by adding the first and second values. In this case, if the third value is equal to 0, both of the first and second values are equal to zero and the field data values of the first, second, and third fields are the same. If the third value is equal to the second value, the first value is equal to 0 and the field data values of the first and second fields are the same. If the third value is equal to the first value, the second value is equal to 0 and the field data values of the second and third fields are the same. Accordingly, the calculator 205 can achieve similar results by calculating the third value by calculating a sum of the first and second values as by calculating a difference between the first and second values.

The comparer 207 selects one of the first field and the third field, i.e., the two consecutive fields of the current field (i.e., the second field), to be used for the interpolation of the current field according to the calculation result provided from the calculator 205 and a predetermined threshold. The comparer 207 determines an absolute value of a difference between the third value and 0, i.e., |the third value−0|, an absolute value of a difference between the third value and the first value, i.e., |the third value−the first value|, and an absolute value of a difference between the third value and the second value, i.e. |the third value−the second value|. The comparer 207 then compares each of the calculated absolute values with the predetermined threshold, and selects one of the first field and the third field based on the comparison results.

The field selection of the comparer 207 can be done as follows.

$$|e_{npre}-e_{nnext}|<\text{threshold}, |e_{npre}-e_{nnext}|=0$$

$$|e_{npre}-e_{nnext}|-e_{nnext}<\text{threshold}, |e_{npre}-e_{nnext}|=e_{nnext}$$

$$|e_{npre}-e_{nnext}|-e_{npre}<\text{threshold}, |e_{npre}-e_{nnext}|=e_{npre}$$ [Equation 3]

If the third value is less than the predetermined threshold, the third value is substantially equal to 0 and the first field, the second field, and the third field have the same field data values. Accordingly, the comparer 207 can select either one of the first field and the third field to be used as the consecutive field of the second field for the interpolation of the second field (i.e., the current field).

If the absolute value of the difference between the third value and the first value, i.e., |the third value−the first value|, is less than the predetermined threshold, the third value is substantially equal to the first value and the second field and the third field have the same field data values. Accordingly, the comparer 207 selects the third field to be used for the interpolation of the second field.

If the absolute value of the subtraction between the third value and the second value, i.e., |the third value−the second value|, is less than the predetermined threshold, the third value is substantially equal to the second value and the first field and the second field have the same field data values. Accordingly, the comparer selects the first field to be user for the interpolation of the second field.

However, if none of the calculated absolute values are less than the predetermined threshold, the third value is not equal to the first value, the second value, or 0. In this case, the first field and the third field both have different field data from that of the second field. Accordingly, the field data of the first field and the third field should not be used for the interpolation of the second field. That is, the field selector 200 does not select either of the first field and the third field. In this case, the interpolator 400 can perform spatial interpolation on the second field.

FIG. 3B illustrates the field selector 200 in the case in which the difference values in the field data are SAD (Sum of Absolute Difference) values. As illustrated in FIG. 3B, the field selector 200 includes a first SAD detecting part 209 and a second SAD detecting part 211 corresponding to the first field difference detecting part 201 and the second field difference detecting part 203 of FIG. 3A, respectively. The first SAD detecting part 209 and the second SAD detecting part 211 detect SAD values between the first field and the second field, and SAD values between the second field and the third field, respectively. The operations of the calculator 205 and the comparer 207 are the same as those in FIG. 3A.

FIG. 3C illustrates the field selector 200 in the case in which the difference values in field data are judder values. As illustrated in FIG. 3C, the field selector 200 includes a first judder detecting part 213 and a first counter 217 corresponding to the first field difference detecting part 201 of FIG. 3A, and a second judder detecting part 215 and a second counter 219 corresponding to the second field difference detecting part 203 of FIG. 3A. The first judder detecting part 213 and the second judder detecting part 219 detect judder values between the first field and the second field and judder values between the second field and the third field, respectively. The first counter 217 and the second counter 219 count amounts of judder detected by the first judder detecting part 213 and the second judder detecting part 215, respectively. The operations of the calculator 205 and the comparer 207 are the same as those in FIG. 3A.

Figure 4:
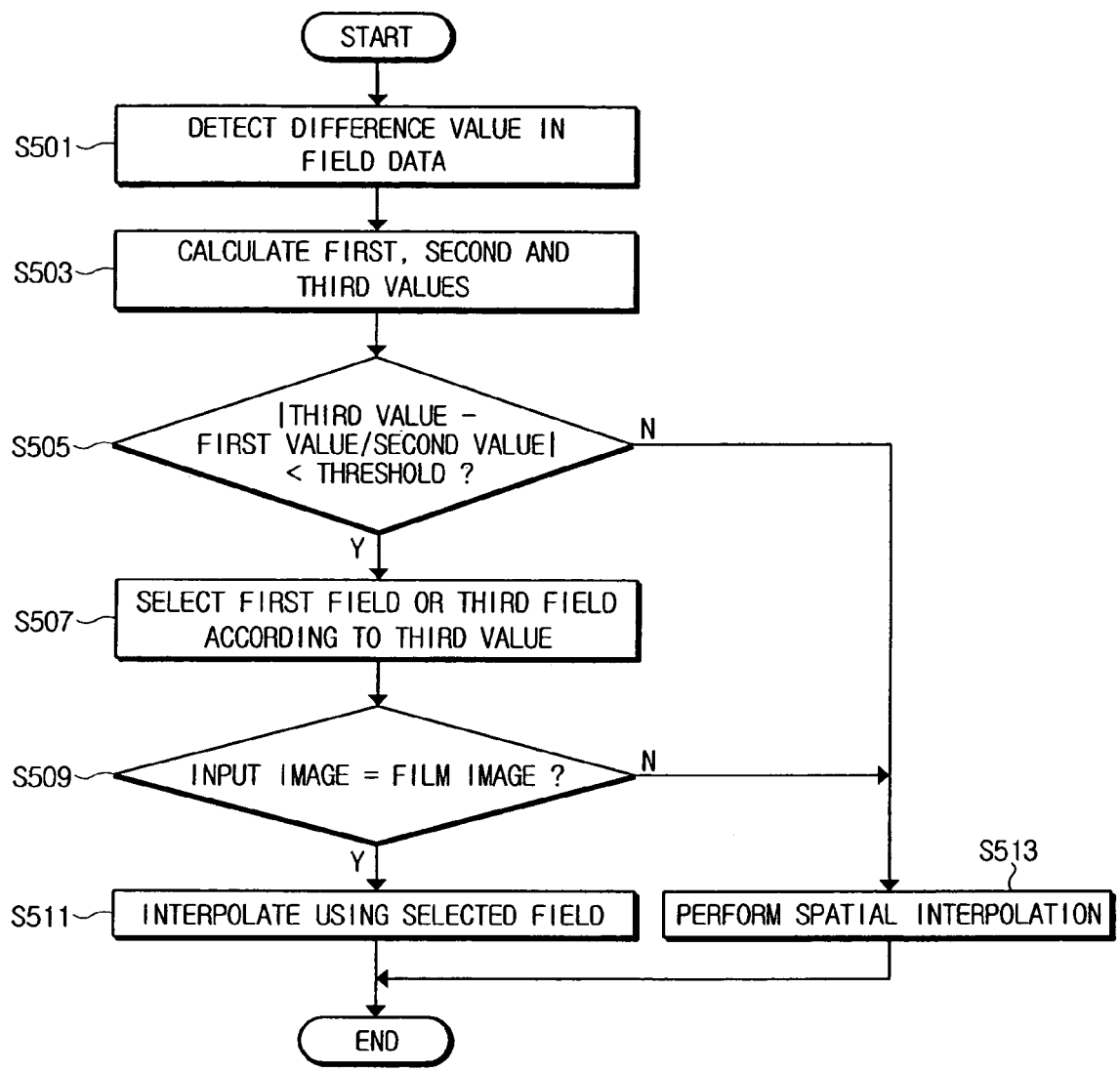
FIG. 4 is a flow chart illustrating an image processing method according to an embodiment of the present general inventive concept.

FIG. 4 is a flow chart illustrating an image processing method according to an embodiment of the present general inventive concept.

Referring to FIGS. 1 and 4, difference values in field data between temporarily consecutive fields of an input image are detected (operation S501). Three temporarily consecutive fields, i.e. a first field, a second field, and a third field, in are selected from the field memory 100 to detect the difference values in the field data of the fields. The difference values in the field data between the first field and the second field and the difference values in the field data between the second field and the third field are then detected. The difference values in the field data can include differences in pixel values between the fields, differences in an amount of judder between the fields, SAD (Sum of Absolute Difference) values between the fields, differences in motion estimation between the fields, etc.

Next, a first value and a second value, each being a sum of difference values in the field data between consecutive fields, and a third value that is a difference between the first value and the second value are calculated (operation S503). The first value is a sum of difference values between the first field and the second field, and the second value is a sum of difference values between the second field and the third field. The calculator 205 calculates the first and second values based on the difference values in the field data between the fields provided from the first field difference detecting part 201 and the second field difference detecting part 203, respectively. The calculator 205 calculates an absolute value of the difference between the first and second values to determine the third value.

When the third value, which is the absolute value of the difference between the first value (the sum of difference values between the first field and the second field) and the second value (the sum of difference values between the second field and the third field), is equal to 0, the first field, the second field, and the third field have the same field data values. When the third value is equal to the second value (the sum of difference values between the second field and the third field), the sum of difference values between the first field and the second field is equal to 0. Accordingly, the first field and the second field have the same field data values. When the third value is equal to the first value (the sum of difference values between the first field and the second field), the sum of difference values between the second field and the third field is equal to 0. Accordingly, the second field and the third field have the same field data values.

Next, the comparer 207 determines whether the absolute value of differences between the third value and the first and second values are less than the predetermined threshold (operation S505). If the third value is equal to 0, it can be compared directly with the predetermined threshold. If the third value is equal to the first value, the absolute value of the difference between the third value and the first value is less than the predetermined threshold. If the third value is equal to the second value, the absolute value of the difference between the third value and the second value is less than the predetermined threshold.

Depending on the third value, one of the first field and the third field is selected for the interpolation of the second field (operation S507). When the third value is less than the predetermined threshold and equal to 0, either one of the first field and the third field can be selected. That is, when the third value is equal to 0, the field data values of the first field, the second field, and the third field are the same. Accordingly, either one of the first field and the third field can be used for the interpolation of the second field.

When the absolute value of the difference between the third value and the second value is less than the predetermined threshold and the third value is equal to the second value (the sum of difference values between the second field and the third field), the first field is selected for the interpolation of the second field. That is, when the third value is equal to the second value (the sum of difference values between the second field and the third field), the field data values of the first field and the second field are the same. Accordingly, the first field can be used for the interpolation of the second field.

When the absolute value of the difference between the third value and the first value is less than the predetermine threshold and the third value is equal to the first value (the sum of difference values between the first field and the second field), the third field is selected for the interpolation of the second field. That is, when the third value is equal to the first value (the sum of difference values between the first field and the second field), the field data values of the second field and the third field are the same. Accordingly, the third field can be used for the interpolation of the second field.

Next, it is determined whether the input image is a film image (operation S509). That is, the film detector 300 compares a pattern generated by using three temporarily consecutive fields with a predetermined film image pattern in order to determine whether the patterns are the same to determine whether the input image is a film image.

If the input image is a film image, the interpolation process is performed using the selected field according to the comparison result of the comparer 207 (operation S511). When the selected field is the first field, the field data of the first field is used to interpolate the second field. When the selected field is the third field, the field data of the third field is used to interpolate the second field.

If each of the absolute values of the differences between the third value and the first and second values are not less than the predetermined threshold (operation S505), or if it is determined that the input image is not a film image (operation S509), spatial interpolation is performed on the second field using the field data of the second field and not the selected field (operation S513). If each of the absolute values of the differences between the third value and the first and second values are greater than the predetermined threshold, the difference values in the field data between the second field and the first field and the difference values in the field data between the second field and the first field are large. Accordingly, although the first field and the third field are consecutive fields of the second field to be interpolated, neither can provide data for the interpolation of the second field. In addition, if the input image is not a film image, the first field and the third field, although both are consecutive fields of the second field, do not originate from the same progressive frame with the second field and thus, have different field data values. Therefore, the interpolation of the second field cannot be performed using these fields.

The present general inventive concept may be embodied as executable code in computer readable media including storage media such as magnetic storage media (ROMs, RAMs, floppy disks, magnetic tapes, etc.), and optically readable media (CD-ROMs, DVDs, etc.).

As described above according to the embodiments of the present general inventive concept, when an input image is a film image without a bad-edit, the interpolation process is executed by selecting two temporarily consecutive fields of a field to be interpolated, and using the field with a smaller difference value in field data from the field to be interpolated. In this manner, a problem of judder in images can be resolved.

Furthermore, even though there might be a detection error in deciding whether an input image is a film image and a bad-edit might be detected in the input image, the interpolation process can be performed stably without turning off the film mode.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing device capable of selecting a field, the device comprising:
   a field selector to select a field to be used to interpolate a current field based on difference values in field data between first, second, and third consecutively input fields in an input image, the field to be used to interpolate the current field being one of the first and third fields, and the current field being the second field;
   a film detector to generate a pattern based on the difference values in the field data between the fields and to determine whether the input image is a film image based on the generated pattern; and
   an interpolator to interpolate the second field using the one of the first and third fields selected by the field selector, if the film detector determines the input image to be the film image.

2. The device according to claim 1, wherein the difference values in the field data between the fields comprise one of differences in pixel values between the fields, differences in an amount of judder between the fields, SAD (Sum of Absolute Difference) values between the fields, and differences in motion estimation between the fields.

3. The device according to claim 1, wherein the field selector comprises:
   a first field difference detecting part to detect first difference values in field data between the first field and the second field;
   a second field difference detecting part to detect second difference values in field data between the second field and the third field;
   a calculator to calculate a first value, a second value and a third value, the first value being a sum of the first difference values detected by the first field difference detecting part, the second value being a sum of the second difference values detected by the second field difference detecting part, and third value being an absolute value of a difference between the first value and the second value; and
   a comparer to compare a predetermined threshold with an absolute value of a difference between the third value and at least one of the first value, the second value, and 0 according to the third value, and to select one of the first field and the third field to be used to interpolate the second field based on the comparison result.

4. The device according to claim 3, wherein the comparer compares the predetermined threshold with an absolute value of:
   the third value if the third value is 0;
   a difference between the third value and the first value if the third value is equal to the first value; and
   a difference between the third value and the second value if the third value is equal to the second value.

5. The device according to claim 4, wherein the comparer selects:
   one of the first field and the third field if the third value is 0 and less than the predetermined threshold;
   the third field if the third value is equal to the first value and the absolute value of the difference between the third value and the first value is less than the predetermined threshold; and
   the first field if the third value is equal to the second value and the absolute value of the difference between the third value and the second value is less than the predetermined threshold.

6. The device according to claim 5, wherein if the third value, the absolute value of the difference between the third value and the first value, and the absolute value of the difference between the third value and the second value are each greater than or equal to the predetermined threshold, the interpolator interpolates the second field based on an adjacent pixel value to a pixel to be interpolated within the second field.

7. The device according to claim 3, wherein the first field difference detecting part comprises a first SAD (Sum of Absolute Difference) detecting unit to detect SAD values in the field data between the first and second fields, and the second field difference detecting part comprises a second SAD detecting unit to detect SAD values in the field data between the second and third fields.

8. The device according to claim 3, wherein the first field difference detecting part comprises a first judder detector to detect judder in the field data between the first and second fields and a first counter to count the judder detected by the first judder detector, and the second field difference detecting part comprises a second judder detector to detect judder in the field data between the second and third fields and a second counter to count the judder detected by the second judder detector.

9. The device according to claim 1, wherein if the input image is not a film image, the interpolator interpolates the second field based on an adjacent pixel value to a pixel to be interpolated within the second field.

10. An image processing device, comprising:
a film detector to determine whether an input image is a film image;
a selection unit to receive a current field of an input image to be interpolated and first and second neighboring fields of the current field and to determine which of the first and second neighboring fields originates from the same progressive frame of the input image as the current field; and
an interpolation unit to temporally interpolate the current field using one of the first and second neighboring fields determined to originate from the same progressive frame as the current field when the film detector determines that the input image is the film image.

11. The image processing device according to claim 10, wherein the interpolation unit spatially interpolates the current field when the film detector determines that the input image is not the film image.

12. The image processing device according to claim 10, wherein the selection unit detects first difference values between field data of the first neighboring field and the current field and second difference values between field data the second neighboring field and the current field, and determines whether the first and second neighboring fields originate from the same progressive frame as the current field according to the first and second difference values.

13. The image processing device according to claim 12, wherein the selection unit calculates a first sum of the first difference values, a second sum of the second difference values, and a third sum of the first and second sums, and compares the first second and third sums with a predetermined threshold to determine whether the first and second neighboring fields to determine whether the first and second neighboring fields originate from the same progressive frame as the current field according to the first and second difference values.

14. The image processing device according to claim 13, wherein when the first sum is less than the predetermined threshold value the selection unit determines that the first neighboring field originates from the same progressive frame as the current field, when the second sum is less than the predetermined threshold value the selection unit determines that the second neighboring field originates from the same progressive frame as the current field, and when the third sum is less than the predetermined threshold value, the selection unit determines that the first and second neighboring fields originate from the same progressive frame as the current field.

15. The image processing device according to claim 14, wherein if each of the first, second, and third sums are greater than or equal to the predetermined threshold, the interpolation unit spatially interpolates the current field.

16. The image processing device according to claim 12, wherein when a sum is the first difference values is substantially equal to zero, the selection unit determines that the first neighboring field originates from the same progressive frame as the current field, and when a sum of the second difference values is substantially equal to zero, the selection unit determines that the second neighboring field originates from the same progressive frame as the current field.

17. An interpolator usable with an image processing device to interpolate a current field of an input film image, comprising:
a selection unit to select one of a previous field and a next field of the input film image as having small difference values with respect to the current field; and
a temporal interpolation unit to temporally interpolate the current field using field data of the one of the previous field and the next field selected by the selection unit.

18. The interpolator according to claim 17, further comprising:
a spatial interpolation unit to spatially interpolate the current field if the selection unit determines that neither one of the previous field and the next field have the small difference values with respect to the current field.

19. An image processing method, the method comprising:
selecting a field to be used to interpolate a current field based on difference values in field data between first, second, and third consecutively input fields in an input image, the field to use to interpolate the current field being one of the first and third fields and the current field being the second field;
generating a pattern based on the difference values in the field data between the first, second, and third fields, and determining whether the input image is a film image based on the generated pattern; and
interpolating the second field using the one of the first and third fields selected by the field selector if the input image is the film image.

20. The method according to claim 19, wherein the difference values in the field data between the fields comprises one of differences in pixel values between the fields, differences in an amount of judder between the fields, SAD (Sum of Absolute Difference) values between the fields, and differences in motion estimation between the fields.

21. The method according to claim 19, wherein the selecting of the field to be used to interpolate the current field comprises:
detecting first difference values in field data between the first field and the second field and second difference values in field data between the second field and the third field;
calculating a first value, a second value and a third value, the first value being a sum of the first difference values, the second value being a sum of the second difference values, and third value being an absolute value of a difference between the first value and the second value; and
comparing a predetermined threshold with an absolute value of a difference between the third value and at least one of the first value, the second value, and 0 according to the third value, and selecting one of the first field and the third field to be used to interpolate the second field based on the comparison result.

22. The method according to claim 21, wherein the comparing of the predetermined threshold with the absolute value of the difference between the third value and at least one of the first value, the second value, and 0 according to the third value comprises:
comparing the predetermined threshold with the third value if the third value is 0;
comparing the predetermined threshold with the difference between the third value and the first value if the third value is equal to the first value; and
comparing the predetermined threshold with the difference between the third value and the second value if the third value is equal to the second value.

23. The method according to claim 22, wherein, in the selecting of one of the first field and the third field to be used to interpolate the second field based on the comparison result comprises:

selecting one of the first field and the third field if the third value is 0 and less than the predetermined threshold;

selecting the third field if the third value equals to the first value and the difference between the third value and the first value is less than the predetermined threshold, and selecting the first field if the third value equals to the second value and the difference between the third value and the second value is less than the predetermined threshold.

24. The method according to claim 19, further comprising;

interpolating the second field based on an adjacent pixel value to a pixel to be interpolated within the second field if the input image is not determined to be the film image.

25. A method of processing an input image, comprising:

determining whether the input image is a film image;

determining which of first and second neighboring fields of an interpolation target field of the input image originate from the same progressive frame of the input image as the interpolation target field; and temporally interpolating the interpolation target field using one of the first and second neighboring fields determined to originate from the same progressive frame as the interpolation target field when the input image is determined to be the film image.

26. The method according to claim 25, further comprising:

spatially interpolating the interpolation target field when the input image is determined not to be the film image.

27. The method according to claim 25, wherein the determining of which of the neighboring fields of the interpolation target field of the input image originate from the same progressive frame as the interpolation target field comprises:

detecting first difference values between field data of the first neighboring field and the interpolation target field and second difference values between field data of the second neighboring field and the interpolation target field;

calculating a first sum of the first difference values and a second sum of the second difference values; and comparing the first and second sums to a predetermined threshold to determine whether the first and second neighboring fields originate from the same progressive frame as the interpolation target field.

28. The method according to claim 27, wherein the comparing of the first and second sums to the predetermined threshold comprises:

determining that the first field originates from the same progressive frame as the interpolation target field when the first sum is less than the predetermined threshold; and determining that the second field originates from the same progressive frame as the interpolation target field when the second sum is less than the predetermined threshold.

29. The method according to claim 28, further comprising:

spatially interpolating the interpolation target field when neither of the first and second sums are less than the predetermined threshold.

30. A method of interpolating a current field of an input film image, comprising:

selecting one of a previous field and a next field of the input film image as having small difference values relative to the current field; and temporally interpolating the current field using field data of the selected one of the previous field and the next field.

31. The method according to claim 30, further comprising:

spatially interpolating the current field if neither one of the previous field and the next field have the small difference values relative to the current field.

32. A computer readable recording medium to perform an image processing method, the method comprising:

selecting a field to use to interpolate a current field based on difference values in field data among first, second, and third fields being consecutively input in an input image, the field to use to interpolate the current field being one of the first and third fields and the current field being the second field;

generating a pattern based on the difference values in the field data between first, second, and third fields, and determining whether the input image is a film image based on the generated pattern; and interpolating the second field using the one of the first and second field selected by the field selector if the input image is a film image.

33. A computer readable recording medium to perform a method of processing an input image, the method comprising:

determining whether the input image is a film image;

determining which of first and second neighboring fields of an interpolation target field of the input image originate from the same progressive frame of the input image as the interpolation target field; and temporally interpolating the interpolation target field using one of the first and second neighboring fields determined to originate from the same progressive frame as the interpolation target field when the input image is determined to be the film image.

* * * * *